(12) United States Patent
Yang

(10) Patent No.: US 8,975,835 B2
(45) Date of Patent: Mar. 10, 2015

(54) BACKLIGHT DIMMER CIRCUIT AND BACKLIGHT DIMMING METHOD

(71) Applicant: Shenzhen China Star Optoelectronics Technology Co., LTD., Shenzhen City, Guangdong Province (CN)

(72) Inventor: Xiang Yang, Shenzhen (CN)

(73) Assignee: Shenzhen China Star Optoelctronics Technology Co., Ltd., Shenzhen, Guangdong Province (CN)

( * ) Notice: Subject to any disclaimer, the term of this patent is extended or adjusted under 35 U.S.C. 154(b) by 98 days.

(21) Appl. No.: 13/807,722

(22) PCT Filed: Nov. 25, 2012

(86) PCT No.: PCT/CN2012/085224
§ 371 (c)(1),
(2) Date: Dec. 28, 2012

(87) PCT Pub. No.: WO2014/075336
PCT Pub. Date: May 22, 2014

(65) Prior Publication Data
US 2014/0191680 A1 Jul. 10, 2014

(30) Foreign Application Priority Data

Nov. 16, 2012 (CN) .......................... 2012 1 0465169

(51) Int. Cl.
| | |
|---|---|
| H05B 37/02 | (2006.01) |
| H05B 33/08 | (2006.01) |
| G09G 3/34 | (2006.01) |
| G09G 3/36 | (2006.01) |
| H04N 13/00 | (2006.01) |

(52) U.S. Cl.
CPC .............. *H05B 33/0809* (2013.01); *G09G 3/34* (2013.01); *G09G 3/36* (2013.01); *H04N 13/00* (2013.01)
USPC ........................................ 315/307; 315/209 R

(58) Field of Classification Search
USPC .......... 315/291, 297, 307, 209 R; 345/84, 99, 345/102, 690
See application file for complete search history.

(56) References Cited

U.S. PATENT DOCUMENTS

| | | | |
|---|---|---|---|
| 8,022,635 B2 * | 9/2011 | Yoshida et al. ............ | 315/209 R |
| 2004/0095081 A1 * | 5/2004 | Kernahan ...................... | 315/307 |
| 2010/0020004 A1 | 1/2010 | Smith | |
| 2010/0164858 A1 * | 7/2010 | Kikuchi ........................ | 345/102 |
| 2010/0315442 A1 * | 12/2010 | Pauritsch ...................... | 345/690 |
| 2011/0128303 A1 * | 6/2011 | Yonemaru et al. ............ | 345/690 |
| 2011/0157241 A1 * | 6/2011 | Lee et al. ...................... | 345/690 |
| 2013/0002732 A1 * | 1/2013 | Pauritsch ...................... | 345/690 |

FOREIGN PATENT DOCUMENTS

CN 102572476 A 7/2012

* cited by examiner

Primary Examiner — Tung X Le
(74) Attorney, Agent, or Firm — Cheng-Ju Chiang

(57) ABSTRACT

The present invention relates to a backlight dimmer circuit and a backlight dimming method. The backlight dimmer circuit includes a PLL dimming module, which detects a rising edge of a 3D synchronous signal to generate multiple channels of 3D mode dimming signal in phase with the 3D synchronous signal; a phase delay module, which generates time-divided outputs of the multiple channels of 3D mode dimming signal according to a delay set value; an external dimming module, which receives an external dimming signal to generate a 2D mode dimming signal; and a trigger, which receives the 2D mode dimming signal and the multiple channels of 3D mode dimming signal and determines whether to output the 2D mode dimming signal or the multiple channels of 3D mode dimming signal according to a 2D/3D conversion signal.

7 Claims, 1 Drawing Sheet

BACKLIGHT DIMMER CIRCUIT AND BACKLIGHT DIMMING METHOD

BACKGROUND OF THE INVENTION

1. Field of the Invention

The present invention relates to the field of liquid crystal displaying, and in particular to a backlight dimmer circuit and a backlight dimming method.

2. The Related Arts

The fast development of LED televisions is now proceeding to a new age of 3D liquid crystal television. The most commonly adopted technique of 3D liquid crystal television is shutter glass 3D displaying technique, which uses sectionized flicker of backlight to separately display left-eye and right-eye signals. This, together with synchronous flicker glasses, enables left and right eyes to see different images. The shutter glass 3D displaying technique allows human eyes to perceive a visual effect just like stereoscopic movie and generally comprises alternately outputting left-eye and right-eye frames to liquid crystal panels to drive the liquid crystal panels to respectively form left-eye and right-eye images. This, together with irradiation with scanning backlight units and timing control of the shutter glasses, enables the left-eye and right-eye signals to respectively stimulate left and right eyes, making a person perceiving 3D images.

In the shutter glass 3D displaying technique, it often needs a timing controller (TCON) to convert 2D and 3D dimming information (synchronous timing, dimming duty ratio, 2D/3D conversion instruction) from a main board into series port interface (SPI) signal to microcontroller unit (MCU) to be decoded by MCU into signals that are usable to LED driver to be sent to an LED driver IC, where conversion is made by the LED driver IC into a corresponding dimming duty and electrical current fed to LEDs.

A drawback of the conventional backlight dimming technique is that the solution is complicated, whereby signals, when being transmitted and processed, are easily interfered with by noise. Further, such a solution is of a high cost. Thus, improvement is urgently desired.

SUMMARY OF THE INVENTION

Thus, an object of the present invention is to provide a backlight dimmer circuit, which reduces transmission of signal so as to reduce the potential risk of signal being interfered with by nose during the transmission.

Another object of the present invention is to provide a backlight dimming method that reduces transmission of signal so as to reduce the potential risk of signal being interfered with by nose during the transmission.

To achieve the objects, the present invention provides a backlight dimmer circuit, which comprises:

a PLL (Phase-Locked Loop) dimming module, which detects a rising edge of a 3D synchronous signal in order to generate multiple channels of 3D mode dimming signal that are in phase with the 3D synchronous signal, the PLL dimming module further determining duty ratio of 3D mode according to analog dimming DC duty;

a phase delay module, which receives the multiple channels of 3D mode dimming signal from the PLL dimming module and generates time-divided outputs of the multiple channels of 3D mode dimming signal in a channel by channel manner according to a delay set value;

an external dimming module, which receives an external dimming signal to generate a 2D mode dimming signal; and a trigger, which receives the 2D mode dimming signal and the multiple channels of 3D mode dimming signal that is output in a time-divided and channel by channel manner and determines whether to output the 2D mode dimming signal or the multiple channels of 3D mode dimming signal that is output in a channel by channel manner according to a 2D/3D conversion signal.

Wherein, the PLL dimming module is an analog PLL or a digital PLL.

Wherein, the analog PLL generally comprises a phase reference extraction circuit, a voltage controlled oscillator, a phase comparator, and a control circuit, the analog PLL extracting the 3D synchronous signal as a phase reference signal, the voltage controlled oscillator comprising a triangular wave generation circuit, which is compared with analog dimming level to generate a square wave.

Wherein, the phase delay module comprises an adjustor counter, whereby when counting of the counter reaches a preset value, a transmission channel of the corresponding channel is opened.

Wherein, the phase delay module is connected to a capacitor and the delay value is determined by the value of the capacitor.

Wherein, the external dimming module comprises an operational amplifier.

Wherein, the 2D/3D conversion signal comprises high and low level signals.

Wherein, the PLL dimming module is integrated in an LED driving chip.

The present invention also provides a backlight dimmer circuit, which comprises:

a PLL dimming module, which detects a rising edge of a 3D synchronous signal in order to generate multiple channels of 3D mode dimming signal that are in phase with the 3D synchronous signal, the PLL dimming module further determining duty ratio of 3D mode according to analog dimming DC duty;

a phase delay module, which receives the multiple channels of 3D mode dimming signal from the PLL dimming module and generates time-divided outputs of the multiple channels of 3D mode dimming signal in a channel by channel manner according to a delay set value;

an external dimming module, which receives an external dimming signal to generate a 2D mode dimming signal; and a trigger, which receives the 2D mode dimming signal and the multiple channels of 3D mode dimming signal that is output in a time-divided and channel by channel manner and determines whether to output the 2D mode dimming signal or the multiple channels of 3D mode dimming signal that is output in a channel by channel manner according to a 2D/3D conversion signal;

wherein the PLL dimming module is an analog PLL or a digital PLL;

wherein the analog PLL generally comprises a phase reference extraction circuit, a voltage controlled oscillator, a phase comparator, and a control circuit, the analog PLL extracting the 3D synchronous signal as a phase reference signal, the voltage controlled oscillator comprising a triangular wave generation circuit, which is compared with analog dimming level to generate a square wave;

wherein the phase delay module comprises an adjustor counter, whereby when counting of the counter reaches a preset value, a transmission channel of the corresponding channel is opened;

wherein the phase delay module is connected to a capacitor and the delay value is determined by the value of the capacitor;

wherein the external dimming module comprises an operational amplifier;

wherein the 2D/3D conversion signal comprises high and low level signals; and wherein the PLL dimming module is integrated in an LED driving chip.

The present invention further provides a backlight dimming method, which comprises:

(1) using a PLL dimming module to detect a rising edge of a 3D synchronous signal in order to generate multiple channels of 3D mode dimming signal that are in phase with the 3D synchronous signal, the PLL dimming module 11 further determining duty ratio of 3D mode according to analog dimming DC duty;

(2) using a phase delay module to receive the multiple channels of 3D mode dimming signal from the PLL dimming module and generate time-divided outputs of the multiple channels of 3D mode dimming signal in a channel by channel manner according to a delay set value;

(3) using an external dimming module to receive an external dimming signal in order to generate a 2D dimming signal; and (4) using a trigger to receive the 2D mode dimming signal and the multiple channels of 3D mode dimming signal that is output in a time-divided and channel by channel manner and determine whether to output the 2D mode dimming signal or the multiple channels of 3D mode dimming signal that is output in a time-divided and channel by channel manner according to a 2D/3D conversion signal.

Wherein, the PLL dimming module is integrated in an LED driving chip.

The present invention provides a backlight dimmer circuit and a backlight dimming method, which reduces transmission of signal so as to reduce the risk of signal being interfered with during transmission. An integrated arrangement may be adopted so that no excessive signal processing is needed and cost is reduced.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

Figure 1:
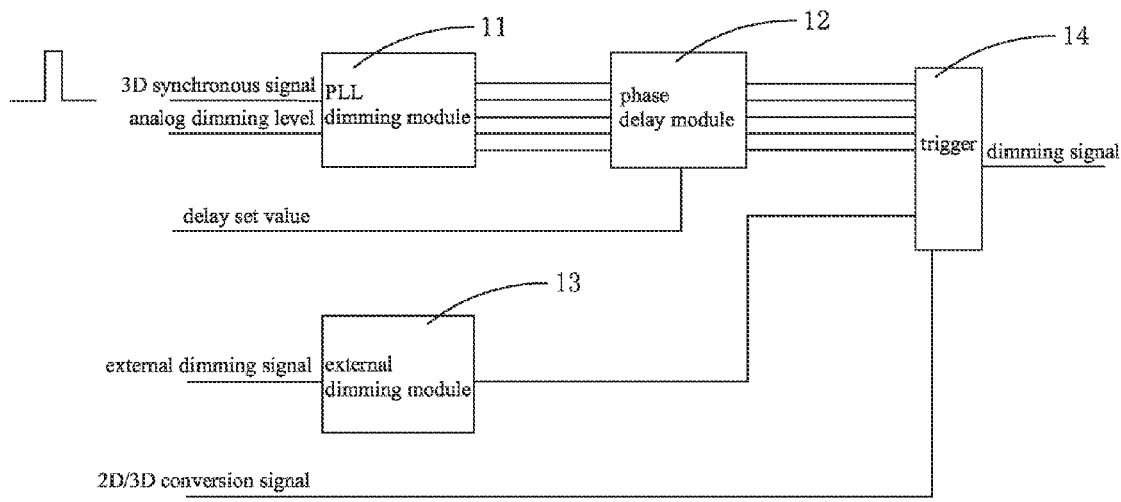
FIG. 1 is a block diagram of a backlight dimmer circuit according to a preferred embodiment of the present invention.

Referring to FIG. 1, which is a block diagram showing a backlight dimmer circuit according to a preferred embodiment of the present invention, the backlight dimmer circuit generally comprises:

a PLL (Phase-Locked Loop) dimming module 11, which detects a rising edge of a 3D synchronous signal in order to generate multiple channels of 3D mode dimming signal that are in phase with the 3D synchronous signal, the PLL dimming module 11 further determining duty ratio of 3D mode according to analog dimming DC duty;

a phase delay module 12, which receives the multiple channels of 3D mode dimming signal from the PLL dimming module 11 and generates time-divided outputs of the multiple channels of 3D mode dimming signal in a channel by channel manner according to a delay set value, whereby with the adjustable phase delay module 12, the dimming signal is outputted in a time-divided manner for achieving the function of 3D scanning;

an external dimming module 13, which receives an external dimming (PDIM) signal to generate a 2D mode dimming signal, wherein the external dimming signal is received from a main board and the external dimming module 13 may be an operational amplifier built in LED driver chip to follow the PDIM signal; and a trigger 14, which receives the 2D mode dimming signal and the multiple channels of 3D mode dimming signal that is output in a time-divided and channel by channel manner and determines whether to output the 2D mode dimming signal or the multiple channels of 3D mode dimming signal that is output in a channel by channel manner according to a 2D/3D conversion signal. The 2D or 3D mode dimming signal so output is then used to drive an LED backlight of a liquid crystal display device. The 2D/3D conversion signal can be high and low level signals. The trigger 14 follows the 2D/3D conversion signal to determine which one of the dimming signals is to be output. For example, the high level can be set as 3D, while the low level is 2D.

The 2D/3D conversion signal can be transmitted through a jointed selection circuit in order to shield the 3D synchronous signal in the 2D mode. The 3D synchronous signal is generally a vertical synchronous (VSYNC) signal supplied from the main board, which uses the PDIM signal from the main board to proceed with dimming operation. In the 3D mode, the PDIM signal is shielded and VSYNC signal is selected.

The PLL dimming module 11 can be analog PLL or digital PLL. The analog PLL is generally composed of a phase reference extraction circuit, a voltage controlled oscillator, a phase comparator, and a control circuit. The analog PLL extracts the 3D synchronous signal as a phase reference signal. The voltage controlled oscillator comprises a triangular wave generation circuit, which is compared with analog dimming level to generate a square wave. The PLL dimming module 11 can be integrated in the LED driving chip to reduce transmission of signal and thus reduce the risk of being interfered with during the transmission of the signal. The integrated arrangement eliminates excessive information processing and reduces cost. The phase delay module 12, the external dimming module 13, or the trigger 14 can also be integrated in the LED driving chip.

The phase delay module 12 may contain therein an adjustor counter. When the counting of the counter reaches a preset value, a transmission channel of the corresponding channel is opened. The multiple transmission channels are done in the same way. Consequently, the dimming signal can be outputted in a time division manner to achieve the function of 3D scanning. The phase delay module 12 can be connected to a capacitor and thus the delay value is determined by the value of the capacitor. Namely, the delay time is determined by the value of the capacitor.

Figure 2:
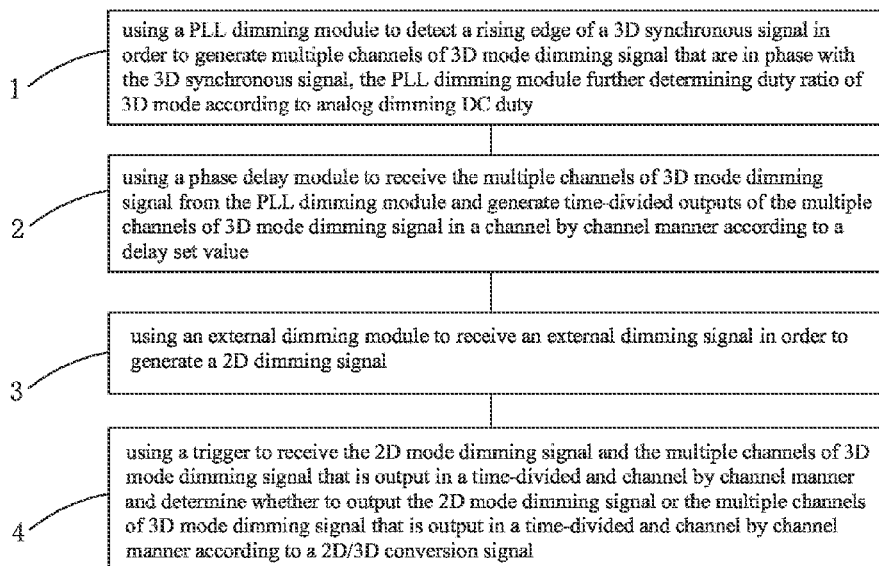
FIG. 2 is a flow chart illustrating a backlight dimming method according to a preferred embodiment of the present invention.

Referring to FIG. 2, which is a flow chart illustrating a backlight dimming method according to a preferred embodiment of the present invention, the backlight dimming method generally comprises:

Step 1: using a PLL dimming module to detect a rising edge of a 3D synchronous signal in order to generate multiple channels of 3D mode dimming signal that are in phase with the 3D synchronous signal, the PLL dimming module 11 further determining duty ratio of 3D mode according to analog dimming DC duty.

Step 2: using a phase delay module to receive the multiple channels of 3D mode dimming signal from the PLL dimming module and generate time-divided outputs of the multiple channels of 3D mode dimming signal in a channel by channel manner according to a delay set value.

Step 3: using an external dimming module to receive an external dimming signal in order to generate a 2D dimming signal.

Step 4: using a trigger to receive the 2D mode dimming signal and the multiple channels of 3D mode dimming signal that is output in a time-divided and channel by channel manner and determine whether to output the 2D mode dimming signal or the multiple channels of 3D mode dimming signal that is output in a time-divided and channel by channel manner according to a 2D/3D conversion signal, wherein the PLL dimming module can be integrated in an LED driving chip.

The present invention provides a backlight dimming method, which integrates a PLL in an LED driving chip and uses the PLL dimming module to detect a 3D synchronous signal so as to generate dimming signals that are in phase according to the 3D synchronous signal and then uses an adjustable phase delay module to output the dimming signals in a time-divided manner to thereby achieve the function of 3D scanning. Further, with a jointed selection circuit, the 3D synchronous signal is shielded in the 2D mode and PDIM signal of a main board is applied for carrying out dimming. In the 3D mode, the PDIM signal is shielded and VSYNC signal is selected.

In summary, the present invention provides a backlight dimmer circuit and a backlight dimming method, which reduces transmission of signal so as to reduce the risk of signal being interfered with during transmission. An integrated arrangement may be adopted so that no excessive signal processing is needed and cost is reduced.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight dimmer circuit, comprising:
   a PLL (Phase-Locked Loop) dimming module, which detects a rising edge of a 3-dimentional (3D) synchronous signal in order to generate multiple channels of a 3D mode dimming signal that are in phase with the 3D synchronous signal, the PLL dimming module further determining a duty ratio of a 3D mode according to an analog dimming direct current (DC) duty;
   a phase delay module, which receives the multiple channels of the 3D mode dimming signal from the PLL dimming module and generates time-divided outputs of the multiple channels of the 3D mode dimming signal in a channel by channel manner according to a delay set value;
   an external dimming module, which receives an external dimming signal to generate a 2-dimentional (2D) mode dimming signal; and
   a trigger, which receives the 2D mode dimming signal and the multiple channels of the 3D mode dimming signal that is output in a time-divided and channel by channel manner and determines whether to output the 2D mode dimming signal or the multiple channels of the 3D mode dimming signal that is output in a channel by channel manner according to a 2D/3D conversion signal;
   wherein the PLL dimming module is an analog PLL, which comprises a phase reference extraction circuit, a voltage controlled oscillator, a phase comparator, and a control circuit, the analog PLL extracting the 3D synchronous signal as a phase reference signal, the voltage controlled oscillator comprising a triangular wave generation circuit, which is compared with an analog dimming level to generate a square wave.

2. The backlight dimmer circuit as claimed in claim 1, wherein the phase delay module comprises an adjustor counter, whereby when counting of the counter reaches a preset value, a transmission channel of the corresponding channel is opened.

3. The backlight dimmer circuit as claimed in claim 1, wherein the phase delay module is connected to a capacitor and the delay value is determined by the value of the capacitor.

4. The backlight dimmer circuit as claimed in claim 1, wherein the external dimming module comprises an operational amplifier.

5. The backlight dimmer circuit as claimed in claim 1, wherein the 2D/3D conversion signal comprises high and low level signals.

6. The backlight dimmer circuit as claimed in claim 1, wherein the PLL dimming module is integrated in an LED (light emitting diode) driving chip.

7. A backlight dimmer circuit, comprising:
   a PLL (Phase-Locked Loop) dimming module, which detects a rising edge of a 3-dimentional (3D) synchronous signal in order to generate multiple channels of a 3D mode dimming signal that are in phase with the 3D synchronous signal, the PLL dimming module further determining a duty ratio of a 3D mode according to an analog dimming direct current (DC) duty;
   a phase delay module, which receives the multiple channels of the 3D mode dimming signal from the PLL dimming module and generates time-divided outputs of the multiple channels of the 3D mode dimming signal in a channel by channel manner according to a delay set value;
   an external dimming module, which receives an external dimming signal to generate a 2-Dimentional (2D) mode dimming signal; and
   a trigger, which receives the 2D mode dimming signal and the multiple channels of the 3D mode dimming signal that is output in a time-divided and channel by channel manner and determines whether to output the 2D mode dimming signal or the multiple channels of the 3D mode dimming signal that is output in a channel by channel manner according to a 2D/3D conversion signal;
   wherein the PLL dimming module is an analog PLL or a digital PLL;
   wherein the analog PLL comprises a phase reference extraction circuit, a voltage controlled oscillator, a phase comparator, and a control circuit, the analog PLL extracting the 3D synchronous signal as a phase reference signal, the voltage controlled oscillator comprising a triangular wave generation circuit, which is compared with an analog dimming level to generate a square wave;
   wherein the phase delay module comprises an adjustor counter, whereby when counting of the counter reaches a preset value, a transmission channel of the corresponding channel is opened;
   wherein the phase delay module is connected to a capacitor and the delay value is determined by the value of the capacitor;
   wherein the external dimming module comprises an operational amplifier;

wherein the 2D/3D conversion signal comprises high and low level signals; and wherein the PLL dimming module is integrated in an LED (light emitting diode) driving chip.

* * * * *